(12) United States Patent
Gabrys

(10) Patent No.: US 10,724,893 B2
(45) Date of Patent: Jul. 28, 2020

(54) LIQUID GAS LEVEL MEASURING SYSTEM

(71) Applicant: AIUT sp. z o. o, Gliwice (PL)

(72) Inventor: Marek Gabrys, Gliwice (PL)

(73) Assignee: AIUT SP. Z O. O, Gliwice (PL)

( * ) Notice: Subject to any disclaimer, the term of this patent is extended or adjusted under 35 U.S.C. 154(b) by 42 days.

(21) Appl. No.: 15/828,955

(22) Filed: Dec. 1, 2017

(65) Prior Publication Data

US 2019/0101433 A1    Apr. 4, 2019

(30) Foreign Application Priority Data

Sep. 29, 2017 (EP) ...................... 17461616

(51) Int. Cl.
| | | |
|---|---|---|
| *G01F 23/38* | (2006.01) | |
| *F17C 13/02* | (2006.01) | |
| *H04W 88/02* | (2009.01) | |
| *G01F 23/00* | (2006.01) | |

(52) U.S. Cl.
CPC ............ *G01F 23/38* (2013.01); *F17C 13/028* (2013.01); *F17C 2221/035* (2013.01); *F17C 2250/0413* (2013.01); *F17C 2250/0426* (2013.01); *H04W 88/02* (2013.01)

(58) Field of Classification Search
CPC .. G01F 23/38; F17C 13/028; F17C 2221/035; F17C 2250/0413; F17C 2250/0426; H04W 88/02
See application file for complete search history.

(56) References Cited

U.S. PATENT DOCUMENTS

| | | | |
|---|---|---|---|
| 6,564,632 B2 | 5/2003 | Ross, Jr. | |
| 6,679,116 B2 | 1/2004 | Ross, Jr. | |
| 8,294,457 B2 | 10/2012 | Schrubbe et al. | |
| 2002/0088278 A1* | 7/2002 | Ross, Jr. ................. | G01F 23/34 73/290 R |
| 2004/0079152 A1 | 4/2004 | Sorenson et al. | |
| 2004/0129075 A1 | 7/2004 | Sorenson | |
| 2004/0182151 A1* | 9/2004 | Meure ................... | G01F 23/363 73/313 |
| 2006/0243345 A1 | 11/2006 | Lease | |
| 2009/0160674 A1 | 6/2009 | Vangala | |
| 2009/0243863 A1 | 10/2009 | Lease | |
| 2012/0068849 A1* | 3/2012 | Ross, Jr. ................. | G01F 23/32 340/618 |
| 2015/0330828 A1* | 11/2015 | Colvin, Jr. .............. | G01F 23/38 702/55 |

* cited by examiner

*Primary Examiner* — Daniel S Larkin
*Assistant Examiner* — Anthony W Megna Fuentes
(74) *Attorney, Agent, or Firm* — Masuvalley & Partners

(57) ABSTRACT

The present invention relates to a liquid gas level measuring system for use in a liquid gas tank and designed to cooperate with a float level gauge head mounted on the gas tank and made of magnetically inert material. The system comprises a dial module 1 attachable to the float level gauge head and a sensor module 2 releasably connected to the dial module 1. The dial module 1 is provided with at least one directing dial magnet 103 magnetically coupled with a drive magnet of the float level gauge. The sensor module includes a Hall effect sensor, a battery 204 and a radio module with an antenna 205, allowing wireless measurement data transmission to a remote location.

9 Claims, 6 Drawing Sheets

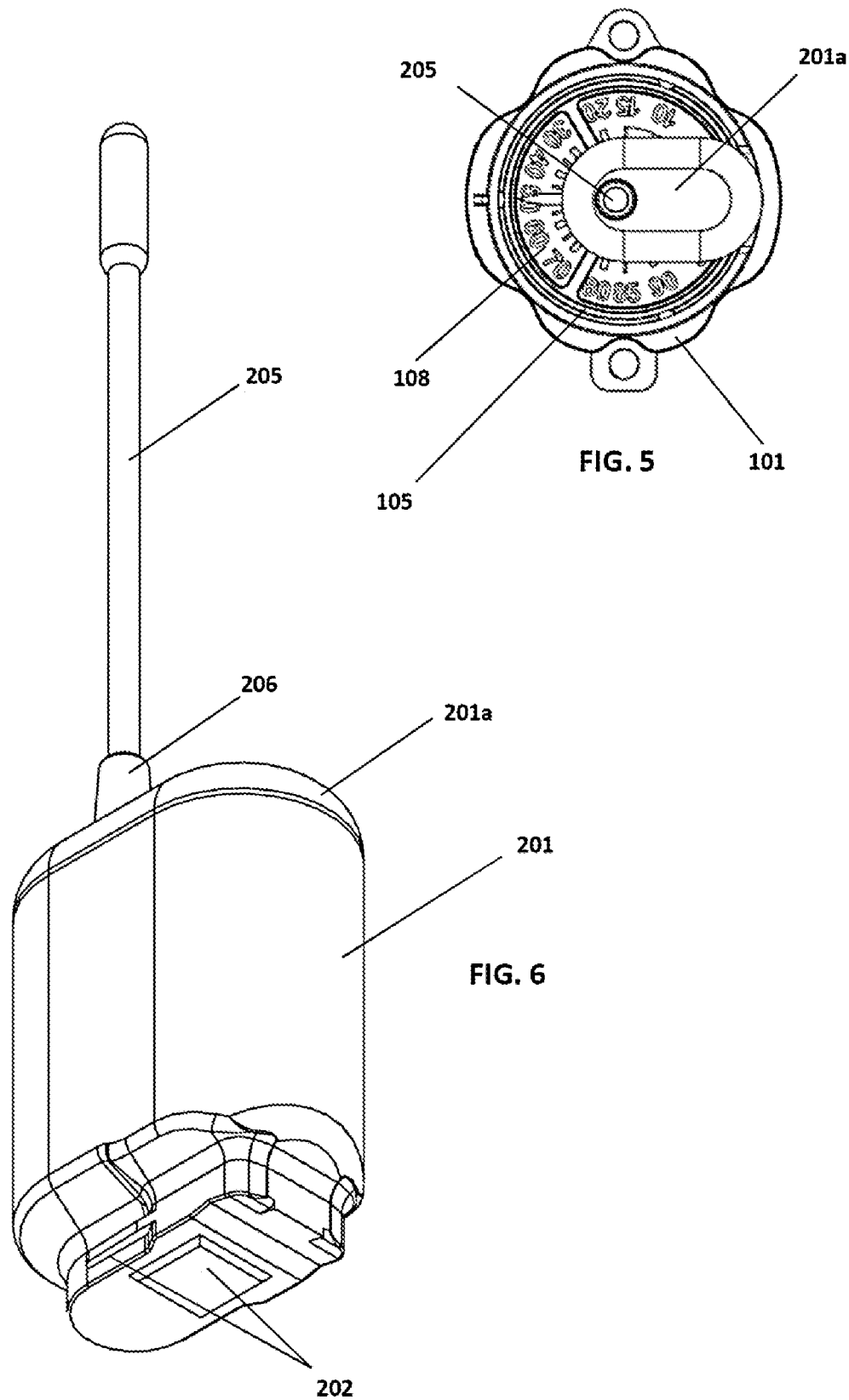

LIQUID GAS LEVEL MEASURING SYSTEM

This application claims priority under 35 U.S.C. § 119 to European Patent Application No. 17461616.9, filed Sep. 29, 2017, which is incorporated herein by reference in its entirety.

TECHNICAL FIELD

The present invention relates to a liquid gas level measuring system for use in a liquid gas tank and designed to cooperate with a float level gauge head mounted on the gas tank. The system allows wireless measurement data transmission to a remote location.

BACKGROUND ART

LPG is used both in various types of industrial installations and in households. From the viewpoint of a gas supplier acquiring new clients and keeping the old ones requires continuous monitoring the actual gas consumption as well as gas level in tanks. These measurements are carried out either periodically in predetermined cycles or on demand, while the measurement results are either determined by visual inspection of rotatable indicator dials provided in measurement heads mounted on the tanks or are transmitted telemetrically.

In mechanical float level gauges commonly used nowadays an element floating on surface of a liquid gas (or other liquid medium) is arranged on a rotating arm provided with a gear transforming the arm rotation in a horizontal axis to a corresponding rotation of a vertically arranged element around a vertical axis. At the uppermost point of the rotating vertical element, in a possibly small distance from the float level gauge head made of magnetically inert material and tightly closing the tank opening, a magnet is arranged, so that magnetic field changes direction corresponding to rotation of the vertical element. A magnetic dial a scale defining the tank filling degree in form of a magnetic dial is mounted on the float level gauge head. A rotary element such as dial disc or a gauge pointer is changing its position according to the changes of the magnetic field direction, and thus showing the floating element position corresponding to the liquid medium present in the tank. Such float level gauges are considered reliable due to relatively simple mechanical construction, but they require direct visual inspection of the dial to retrieve the actual gas level status.

US 2004/0079152 A1 discloses an electrical system for measuring liquid gas amount in a tank, the system comprising a set of magnetic sensors, a temperature measurement module provided with a microprocessor with a radio module, wherein magneto-resistive transducers of magnetic field are used, having sensitivity higher than Hall effect sensors (can determine smaller fields), but being capable of measuring only small field ranges. Radio module allows to send measurement results to a remote location. However, even use of a few magnetic sensors arranged in various distance from the magnet does not guarantee a reliable operation in case of various types of level indicators.

US 2006/243345 A1 discloses a wireless tank level monitoring system utilizing a Hall effect sensor and having a base station with a battery status control connected to a radio module.

Further, in US 2004/0129075 A1 a remote fluid level detection system is disclosed, wherein a microcontroller-based electronic circuit comprising a magnetic field sensor (such as GMR AA002-02 available from NVE Corporation) detects orientation of the magnetic field generated by a single permanent magnet inside the existing gauge mechanism. The system includes a tank module comprising a housing, a battery cover, battery units, a microcontroller, a circuit board, an RF transmitter, a magnetic sensor, an attachment band, electrical connection wires, a momentary switch, an electric inclinometer, a liquid crystal display, a clock oscillator, and a voltage regulator. The tank module housing is dimensioned to fit over the pre-existing tank gauge and is secured to the gauge by means of the attachment band. The gauge is mounted on the top of the tank by mounting bolts, connecting the gauge housing to the tank, and the gauge face comprises a simple compass tracking the magnet position.

Yet further, US 2009/0243863 A1 discloses a cellular tank level monitor for liquefied gas and cryogenic liquids, the monitor being configured to be magnetically attached to the fuel tank and operatively connected to a Hall effect module.

US 2009/0160674 A1 discloses a wireless telemetry system consisting of a sensor (such as a customary Hall effect sensor) generating an electrical signal indicative of the level and/or usage, a wireless transmitter transforming this signal into an signal compatible with Wi-Fi (802.11a/b/g/n) transmission protocol, and a Wi-Fi wireless router receiving this WiFi signal and storing it on a host computer for subsequent transmission to a server computer located at a distant location over the public internet.

Moreover, in U.S. Pat. No. 6,679,116 B2 a liquid level gauge, assembly including a dial assembly having a shaped magnet and a removable magnetic detector with a Hall effect sensor. In this assembly the Hall effect sensor is connected to a dial with a cable. Further, a measurement of magnetic field is based on detection of rotation of a shaped magnet being magnetically coupled to a tank (gauge) magnet rotating in response to movements of the float arm.

U.S. Pat. No. 8,294,457 B2 discloses a rotary magnetic encoder assembly comprising a magnetic field sensor arrangement, a rotatable magnet disposed adjacent the magnetic field sensor arrangement and having a magnetic field that is sensible by the magnetic field sensor arrangement, and a rotary encoder shaft that effects rotation of the rotatable magnet without contacting the rotatable magnet.

In U.S. Pat. No. 6,564,632 B2 a liquid level gauge assembly is disclosed including a dial assembly having a shaped magnet and a removable magnetic detector with a magnetic sensor, preferably a Hall sensor. The dial assembly is capable of providing both visual and electrical output signal related to the liquid level measured by the gauge assembly. The shaped magnet has a variable thickness which, in cooperation with the Hall sensor, provides a linear output signal from the detector over more than 270 degrees. The dial assembly cover is provided with a cover having a channel-like socket adapted for receiving a Hall sensor-containing detector connected by an electric cable to external devices.

Despite numerous systems for measuring liquid gas level using magnetic field sensors and wirelessly transmitting the measurement results to a remote location there is a constant need for further improvements. The areas of improvements involves optimizing the balance between sensitivity and measurement range of a magnetic field sensor, eliminating the elements prone to damage (such as cables connecting component modules of the measurement system), increasing safety of utilizing the liquid gas level measuring systems and also reducing costs of manufacturing of and installing such smart metering devices.

The above-mentioned safety-related issues include the following problem. Several prior art liquid gas level smart metering devices are formed so as to be mounted on a float level gauge head in place of a simple mechanical dial gauge, which require visual inspection. As a rule such installation is made by means of two cross screws going through two corresponding lugs provided in the lower part of the device housing and engaging the respective threaded holes in the level gauge head. Many end users tend to replace the analogue dial indicators with such devices on their own, using inappropriate tools (such as multi-purpose tools instead of dedicated screwdrivers) or even erroneously manipulating other screws (such as hex(interior) screws commonly used to fix the level gauge head to a tank). This involves increased risk of damaging the devices, unsealing the tanks, dismantling the gauge and releasing the gas, which eventually may result in an explosion. Thus, a need has been observed and identified by the present inventors to provide a system that would allow the end users to change the sensor devices easily (for example in order to replace batteries or damaged electronic modules), while eliminating the need for detaching/attaching modules directly connected to a pressurized gas tank.

SUMMARY OF THE INVENTION

The objective problem solved by the present invention can be thus formulated as providing a liquid gas level measuring system for use in a liquid gas tank and designed to cooperate with a float level gauge head mounted on the gas tank, whereby the above-identified problems associated with using prior art devices could be overcome in a relatively simple and cost-effective manner.

Consequently, the present invention relates to a liquid gas level measuring system for use in a liquid gas tank and designed to cooperate with a float level gauge head mounted on the gas tank and made of magnetically inert material, whereby the system comprises:

- a dial module attachable to the float level gauge head and comprising:
  - a dial module body having its bottom face shaped so as to be mounted in the level gauge head,
  - an indicating rotary element arranged in the dial module body and serving for visual indication of liquid gas level in the tank,
  - at least one dial magnet arranged below the indicating rotary element, whereby said at least one dial magnet and the indicating rotary element are arranged that during rotation about the common vertical rotation axis the rotation angle of said at least one dial magnet corresponds to the rotation angle of the indicating rotary element,
  - a tank volume scale circular in shape and adjusted to cooperate with the indicating rotary element so as to indicate percentage of the tank volume occupied by the liquid gas,
  - and a dial module lid provided on its top face with at least one connection element, whereby at least part of the dial module lid peripheral area is made of a transparent material, and
- a sensor module releasably connected to the dial module and comprising:
  - a housing provided with at least one connection element corresponding to the connection element of the dial module lid and adapted to form a releasable connection with the connection element of the dial module lid,
  - an electronic module comprising the Hall effect sensor and the radio module, a battery connected to the electronic module,
  - an antenna connected to the radio module.

The present inventors have achieved a significant improvement in terms of use safety by providing the system in form of two releasably connected modules, i.e. the dial module and the replaceable sensor module. The dial module of the present invention is designed to be mounted in the float level gauge head. As a rule this shall be made once, either by a gas tank manufacturer/provider, or by an authorised service. Once mounted, the dial module of the present invention does not have to be removed by the user wishing to exchange the sensor module. All the activity required from the user is to connect (in particular click-in) the releasable sensor module to a dedicated connecting element (e.g. a socket) arranged on the top face of the dial module lid. In order to exchange the sensor modules, the connection (preferably of click-in type) between the dial module and the sensor module has to be released, the old sensor module has to be detached from the connecting element on the dial module lid top face (e.g. withdrawn from the socket) and replaced by a new one, which is again connected to the dial module in a simple operation requiring neither special training, nor tools of any kind.

It is to be noted that no electrical cables or switches are required to connect both modules, i.e. the dial module and the releasable sensor module. It makes the system of the present invention simpler, easier to use, much more resistant to damage and less expensive.

Yet further advantage of the modular system of the present invention is that using the same standard of releasable connection different sensor modules can be used with the same dial module, which greatly contributes to ease of adjusting the system to constantly developing smart metering IoT-based systems and using various data transmission standards such as LoRa WAN or Sigfox.

The dial module adjusted to be installed in the level indicator head, besides the cooperation with the replaceable sensor module (to generate measurement output signals that can be wirelessly transmitted by radio to a remote location) is fully capable of performing the functions of the mechanical dial assembly, i.e. to enable independent mechanical determination of the liquid gas level in the tank. At least part of the dial module lid peripheral area is made of a transparent material (such as polycarbonate), allowing visual inspection of the actual gas level. The possibility of visual inspection of the actual gas level in the tank, dependent only on mechanical elements and thus providing an alternative for any electronic devices used for measurements and wireless data transmission, is required in LPG tanks for safety reasons.

Furthermore, the present inventors have found that providing an additional guide magnet located between the dial magnet (the movement of which is detected by a magnetic field sensor in a typical dial module) and the magnetic field sensor, allows to achieve a good balance between sensitivity and measurement range of a magnetic field sensor. In general in order to detect magnetic field changes with sufficient accuracy a magnetic field sensor has to cooperate with a carefully selected dial magnet arranged in a precisely determined distance. When a dial magnet and a guide magnet are combined together in one dial module, one of them maintains magnetic coupling, and the other provides improved positioning. In such case a Hall effect sensor providing a range of measured magnetic field broader than magneto-resistive sensors can be used as a magnetic field sensor with no significant deterioration of sensitivity. This contributes to a more balanced and reliable operation. More specifically, the optimum performance of the liquid gas level measuring system according to this preferred embodiment of the system according to the invention in terms of providing balance between sensitivity and measurement range is considered to be a result of a combination of at least three magnets, namely the drive magnet (master), at least one dial magnet (primary slave) and the guide magnet (secondary slave). The two first, i.e. the drive magnet and the dial magnet are magnetically coupled. In turn, the dial magnet and the guide magnet (which preferably are arranged on the opposite sides of the rotary indicating element) in addition to being coupled magnetically are fixed on the common rotary axle. Thus, in this preferred embodiment the dial module comprises also a cylindrical guide magnet arranged above the indicating rotary element and cooperating with the dial magnet(s), whereby the dial magnet(s), the indicating rotary element and the guide magnet are arranged such that during rotation about the common vertical rotation axis the rotation angle of the dial magnet(s) corresponds to the rotation angle of both the indicating rotary element and the cylindrical guide magnet. This combination contributes to increased sensitivity and allows for bigger tolerances with respect to mutual positioning of the system elements.

In one preferred embodiment of the system according to the invention the releasable connection formed by the connection elements of both the dial module lid and the housing is a click-in connection. Such connection can be implemented in a number of various embodiments, varying in forms of connecting elements of the dial module and corresponding connecting elements of the sensor module, but in each case realising the principle of releasable click-in connection, and thus being simple and requiring no tools. In one of such preferred embodiments the connection element of the dial module lid is formed as a socket having engaging means, and the sensor module housing in its lower part is formed as the connection element fitting the inner shape of the socket and is provided with engaging means corresponding to the engaging means of the socket.

In another preferred embodiment the indicating rotary element is a dial disc, which on its surface facing the guide magnet is peripherally provided with the tank volume scale. The tank volume scale shows percentage of the tank capacity (volume). This preferred embodiment involves two variants. In one variant a single dial magnet is arranged axially below the dial disc, while in another variant two dial magnets are arranged symmetrically below the dial disc.

In yet another preferred embodiment of the system according to the invention indicating rotary element is a gauge pointer, and the tank volume scale is formed as a circular insert fixed inside the dial module body facing the dial magnet.

Preferably, the dial module body and the dial module lid are connected to each other by gluing, as it allows to provide required durability and weatherproofness. Some other methods, including ultrasonic welding or use of additional elastic gasket can be also considered either as alternative or complementary to gluing. The dial module lid can be made of any shock-resistant transparent material such as polycarbonate.

In an optional embodiment the connection between the dial module lid and the sensor module housing is additionally sealed, for example to prevent any unauthorised manipulation.

BRIEF DESCRIPTION OF DRAWINGS

Preferred embodiments of the present invention are presented in a more detailed manner with reference to the attached drawing, in which:

FIG. 5 shows a top view of the system of FIG. 2;

FIG. 6 shows a perspective view of a preferred embodiment of the sensor module in assembled state;

DETAILED DESCRIPTION OF PREFERRED EMBODIMENTS

Figure 1:
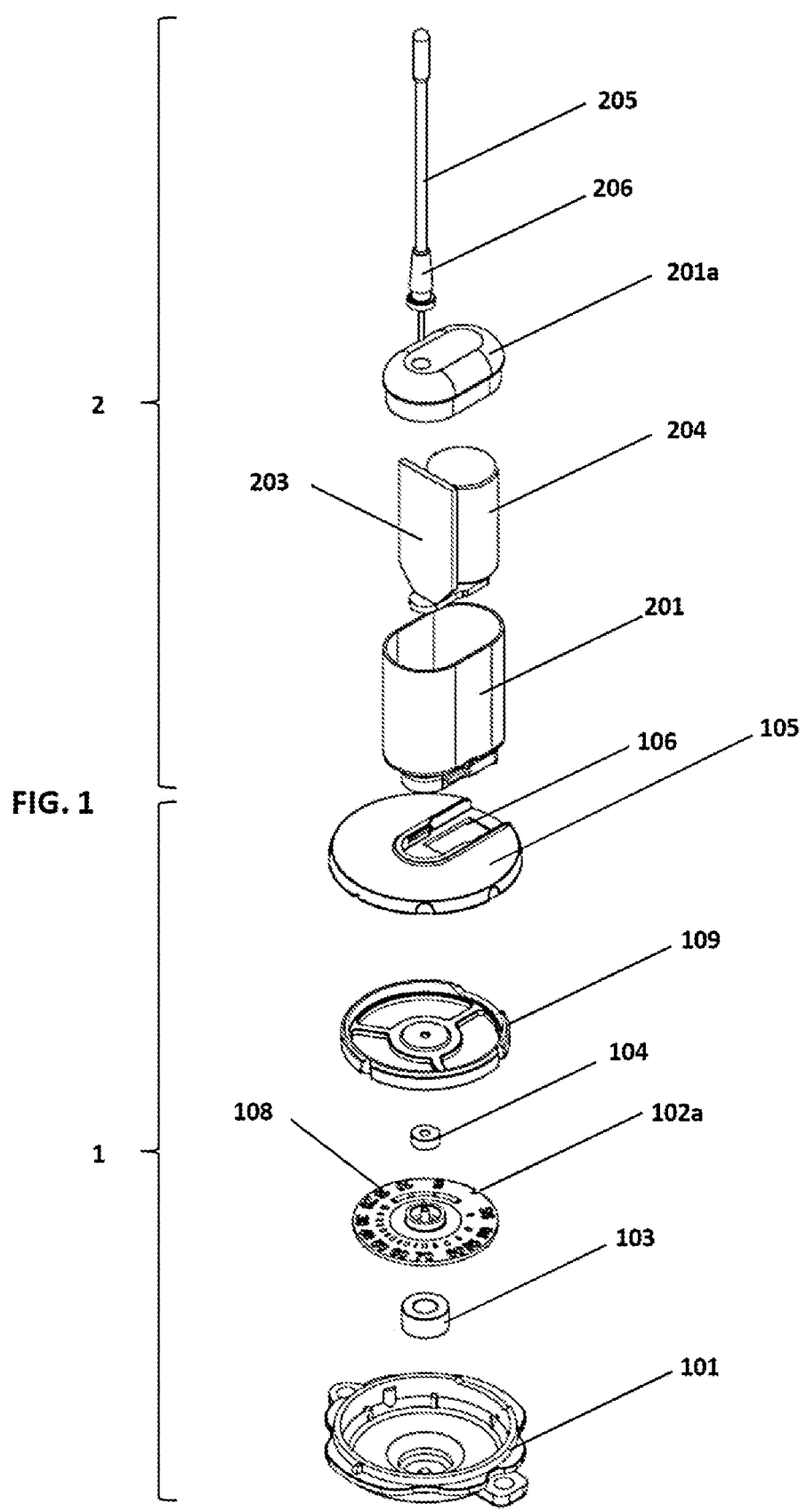
FIG. 1 shows an exploded view of a preferred embodiment of the liquid gas level measuring system according to the invention.
Figure 2:
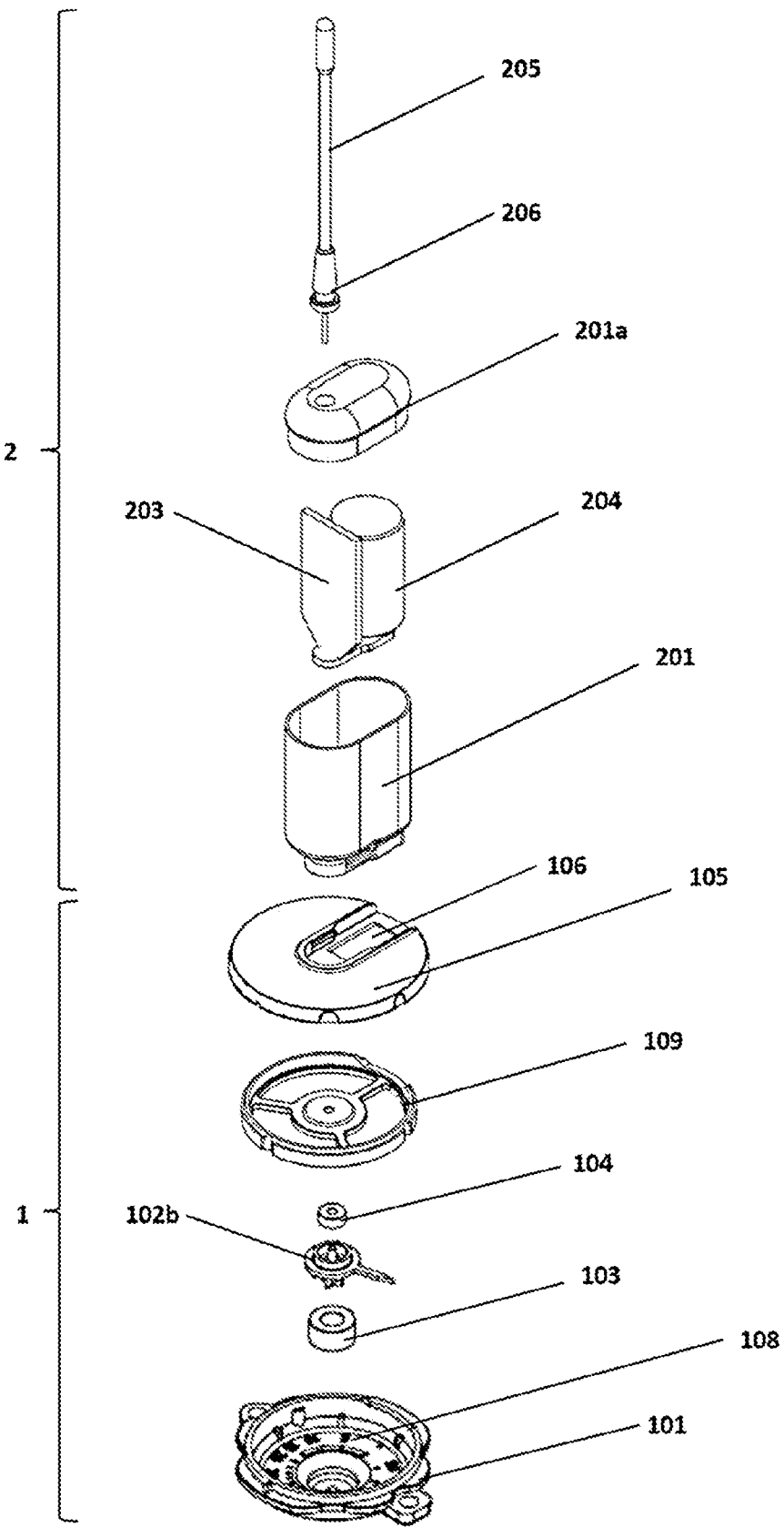
FIG. 2 shows an exploded of view of an alternative preferred embodiment of the liquid gas level measuring system according to the invention.

FIGS. 1 and 2 show two preferred embodiments of the liquid gas level measuring system according to the invention. The system comprises two modules releasably connected together. The first module, i.e. a dial module 1 is attachable to the float level gauge head of a liquid gas tank (not shown). The dial module 1 comprises a dial module body 101 having its bottom face shaped so as to be mounted in the level gauge head (not shown). The dial module body 101 on its periphery is provided with two lugs extending outwardly and arranged opposite one another. These lugs serve to accept screws (typically cross screws), fixing the dial module body 101 to the level gauge head. The dial module 1 comprises also a dial module lid 105, which on its top face has a socket 106. The dial module lid 105 at least on the area outside the socket 106 is made of a transparent material, which allows visual inspection of the liquid gas level. Further details of the dial module 1 components contained in the space between the dial module body 101 and the lid 105 are explained below with reference to two alternative embodiments of the dial module 1, shown in FIGS. 3 and 4, respectively.

As mentioned above, FIGS. 3 and 4 show two alternative embodiments of the dial module 1 of the invention. In both embodiments between the dial module body 101 and the dial module lid 105 the following elements are enclosed: an indicating rotary element, a single dial magnet 103, a cylindrical guide magnet 104, a tank volume scale 108 and a positioning insert 109. The indicating rotary element is arranged in the dial module body 101 and serves for visual indication of liquid gas level in the tank. The dial magnet 103 is arranged below the indicating rotary element and cooperates with the cylindrical guide magnet 104 arranged above the indicating rotary element. The dial magnet 103, the indicating rotary element and the guide magnet 104 are arranged coaxially on the same vertical rotary axle. The tank volume scale 108 is circular in shape and is adjusted to cooperate with the indicating rotary element so as to indicate percentage of the tank volume occupied by the liquid gas. The positioning insert 109 is provided between the guide magnet 104 and the dial module lid 105. The positioning insert 109 is provided with a window 110 on part of its surface. In both alternative embodiments of the dial module 1 shown in FIGS. 3 and 4, respectively, the socket 106 of the dial module lid 105 is provided with engaging means 107.

Figure 3:
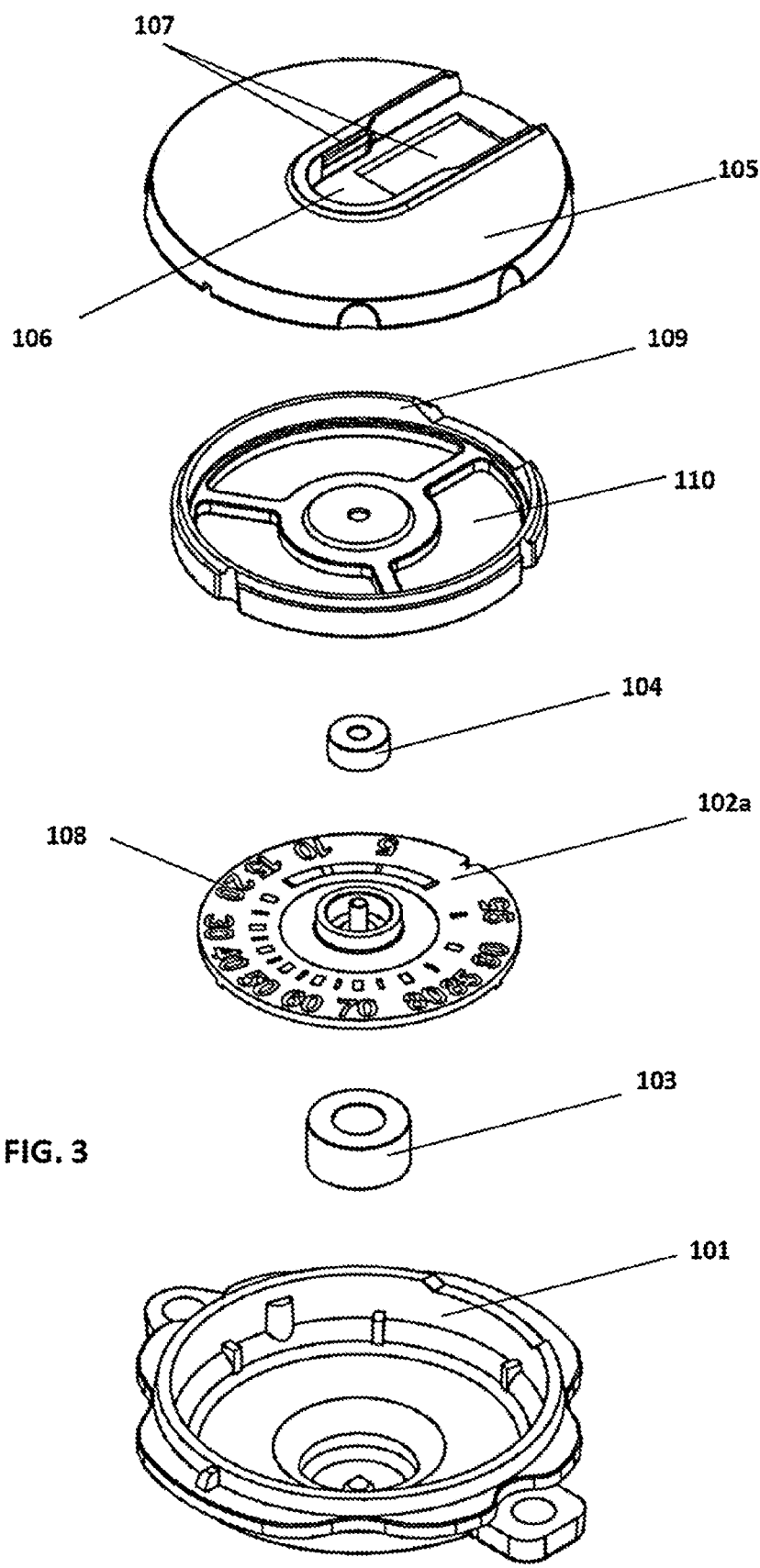
FIG. 3 shows an exploded view of a preferred embodiment of the dial module with a rotary dial disc.

In the preferred embodiment of the dial module 1 shown in FIG. 3 the indicating rotary element is a dial disc 102a, which on its surface facing the guide magnet 104 is peripherally provided with the tank volume scale 108. Thus, visual inspection of the liquid gas level is based on determination of the scale-bearing dial disc 102a position, which can be viewed by an observer through the inspection window 110 and the transparent peripheral part of the dial module lid 105 outside the socket 106.

Figure 4:
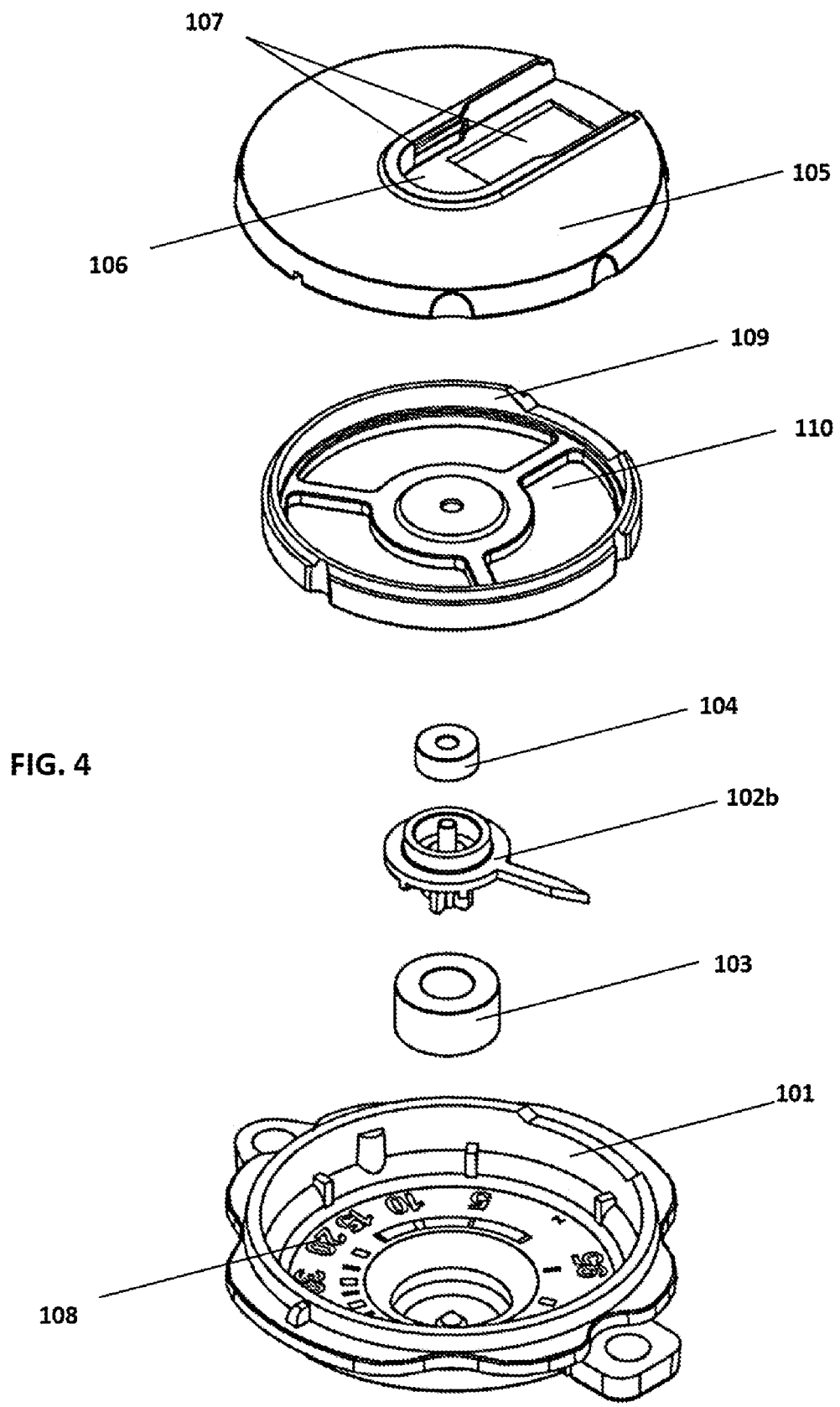
FIG. 4 shows an exploded view of an alternative preferred embodiment of the dial module with a rotary gauge pointer.

In the alternative embodiment of the dial module 1 shown in FIG. 4 the indicating rotary element is a gauge pointer 102b, and the tank volume scale 108 is formed as a circular insert fixed inside the dial module body 101 facing the dial magnet 103. In this case visual inspection of the liquid gas level involves determination of the relative position of the gauge pointer 102b and the scale 108 provided on the circular insert fixed inside the dial module body 101. Again, this relative position of the gauge pointer 102b and the scale 108 can be viewed by an observer through the inspection window 110 and the transparent peripheral part of the dial module lid 105 outside the socket 106.

Coming back to FIGS. 1 and 2 illustrating two alternative preferred embodiments of the system according to the invention, the second module of both these preferred embodiments is a replaceable sensor module 2. FIG. 6 shows a perspective view of the sensor module in assembled state. The sensor module 2 comprises a housing 201, which in its lower part is formed to fit the inner shape of the socket 106 of the dial module 1, and which is provided with engaging means 202 (shown in FIG. 6) that correspond to the engaging means 107 of the socket 106 and together with them form a releasable click-in connection. Further, the sensor module 2 comprises a electronic module 203 comprising the Hall effect sensor and the radio module. Yet further, the sensor module 2 comprises a battery 204 (such as lithium battery) connected to the electronic module 203. Both the electronic module 203 and the battery 204 are arranged inside the housing 201. The sensor module 2 also comprises an antenna 205 connected to the electronic module 203 and extending outside the housing 201 through a passage provided with a sealing flange 206. In the preferred embodiments shown in FIGS. 1 and 2 the sensor module housing 201 comprises a housing cap 201a. However, the housing 201 can be also formed differently, as long as it provides safe space for the electronic module 203, the battery 204 and other optional elements required to perform the sensor module 2 function.

Once connected, the dial module body 101 and the dial module lid 105 enclose the elements contained therebetween in a tight and weatherproof manner. Similarly, the housing 201 encloses the electronic module 203 and the battery 204 in a tight and weatherproof manner. Preferably, all these external elements, i.e. the dial module body 101, the lid 105 and the sensor module housing 201 are made of a shock-resistant material such as polycarbonate, or other materials showing similar properties. This allows to use the system of the invention to be used outdoor in any atmospheric conditions all year round and to protect the other system elements from mechanical damage.

FIG. 5 shows a top view of the preferred embodiment of the system of FIG. 2. In this orientation it is clear that the indication of the liquid gas level in the tank can be determined independently by means of the sensor module 2, which can further transmit the measurement results to a remote location by radio (the antenna 205 extending upwards from the sensor module housing 201 is shown in FIG. 5), and by visual inspection of the gauge pointer 102b with respect to the tank volume scale 108 visible through transparent windows 110 of the positioning insert 109 and the transparent peripheral area of the dial module lid 105.

Figure 7A:
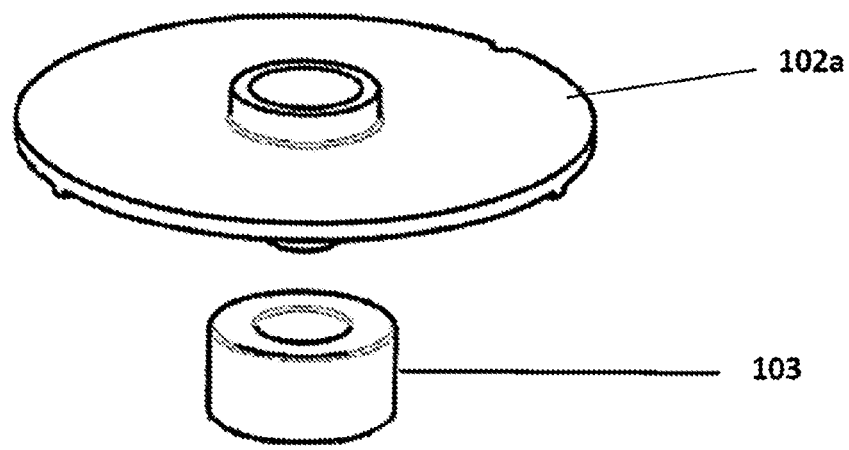
FIGS. 7A, 7B show two alternative embodiments of arrangement of dial magnet(s) with respect to the dial disc.
Figure 7B:
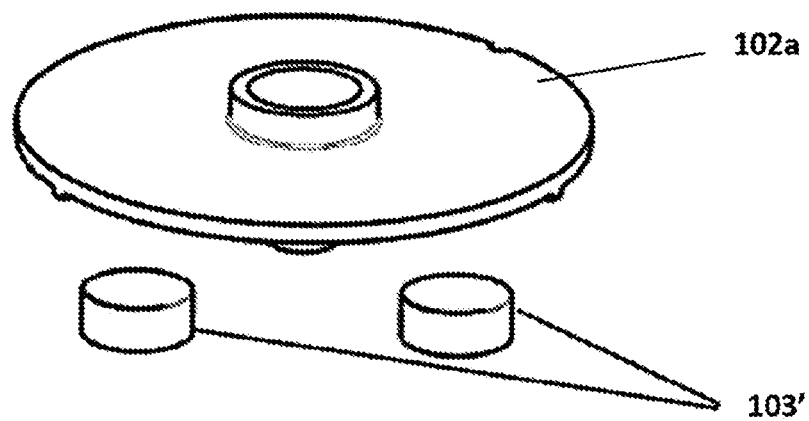

Further, FIG. 7A shows a preferred embodiment of the system according to the invention, wherein a single dial magnet 103 is arranged axially below the dial disc 102a. In an alternative embodiment shown in FIG. 7B two dial magnets 103' are arranged symmetrically below the dial disc 102a.

The operation of the liquid gas level measuring system according to the invention is as follows. The float level gauge installed in the gas tank converts the liquid gas level to rotation angle of the vertical rotary axle connected to the level gauge. A drive magnet (not shown) is provided at the top end of the vertical rotary axle of the level gauge. This magnet is generally enclosed in the level gauge housing made of magnetically inert material. As the magnet is fixed to the rotary axle it rotates along with it. In this way the liquid gas level in the tank corresponds to the inclination angle of the magnetic field. The level gauge head is connected to the tank (commonly by means of hex(interior) screws). It is essential for safe utilization of the tank that this connection is properly sealed. Thus, it is recommended not to manipulate it at all, unless necessary. As explained above, the dial module 1 is mounted on the level gauge head once (by the tank manufacturer or an authorised service) and there is no need to detach it during normal use of the tank. Due to magnetic coupling with the dial magnet 103 (or dial magnets 103') arranged below the indicating rotary element (either in form of the dial disc 102a or the gauge pointer 102b) the rotation of the drive magnet of the float level gauge (master magnet) causes corresponding rotation of the dial magnet(s) 103 (103') [slave magnet(s)]. Since the dial magnet(s) 103 (103') and the indicating rotary element are arranged such that during rotation about the common vertical rotation axis the rotation angle of the dial magnet(s) 103 (103') corresponds to the rotation angle of the indicating rotary element, any rotation of the drive magnet results in corresponding rotation of the indicating rotary element about the vertical rotation axis. Magnetic field changes resulting from the rotation of the slave magnet, i.e. the dial magnet(s) 103 (103') are detected by the magnetic field sensor of the sensor module 2. In the preferred embodiments discussed above the dial module comprises an additional guide magnet 104 arranged above arranged axially above the indicating rotary element. This guide magnet 104 can be defined as a secondary slave magnet, modifying the magnetic field generated by the dial magnet(s) 103 (103') acting here as primary slave magnet(s) so as to improve the quality of the measurement completed by the sensor module 2. The guide magnet 104 is carefully selected to a given magnetic field level, so as to allow proper operation of the sensor module 2.

However, it is also possible to provide the sensor module 2 of a type showing so improved detection capability that no aid of the guide magnet 104 is required. In such case the sensor module 2 detects the changes in magnetic field of the dial magnet(s) 103 (103') only.

Preferably, the electronic module 203 used in the liquid gas level measuring system according to the invention is based on IoT (Internet of Things) concept. The IoT-based sensor module 2 allows the liquid gas level data to be transmitted periodically to the remotely located server of the service provider, thereby allowing to avoid fuel stockout, enhance distribution, relieve the customer/final user from the need of monitoring the fuel inventory. The liquid gas level data can be also transmitted periodically by the IoT-based sensor module 2 to home display or a mobile application to allow the customer/final user to behave in a more energy-efficient manner, inspect proper operation of the fuel provider and negotiate the delivery price based on the actual fuel consumption status. Use of IoT-based electronic module 203 is opening new communication opportunities, showing such advantages as significant device cost reduction, growing communication network opportunities and using different specific data transmission standards such as LoRa WAN or Sigfox, depending on the user preferences.

The invention claimed is:

1. A liquid gas level measuring system for use in a liquid gas tank and designed to cooperate with a float level gauge head mounted on the liquid gas tank and made of magnetically inert material, the system comprising a dial magnet, a Hall effect sensor, a battery, a radio module with an antenna, characterised in that the system comprises: a dial module attachable to the float level gauge head and comprising: a dial module body having its bottom face shaped so as to be mounted in the level gauge head, an indicating rotary element arranged in the dial module body and serving for visual indication of liquid gas level in the liquid gas tank, at least one dial magnet arranged below the indicating rotary element, whereby said at least one dial magnet and the indicating rotary element are arranged such that, during rotation about a common vertical rotation axis, a rotation angle of said at least one dial magnet corresponds to the rotation angle of the indicating rotary element, a tank volume scale circular in shape and adjusted to cooperate with the indicating rotary element so as to indicate percentage of a tank volume occupied by the liquid gas, and a dial module lid provided on its top face with at least one connection element, whereby at least part of the dial module lid peripheral area is made of a transparent material, and a sensor module releasably connected to the dial module and comprising: a housing provided with at least one connection element corresponding to the at least one connection element of the dial module lid and adapted to form a releasable connection with the at least one connection element of the dial module lid, an electronic module comprising the Hall effect sensor and the radio module, a battery connected to the electronic module, the antenna connected to the radio module; wherein the dial module comprises also a cylindrical guide magnet arranged above the indicating rotary element and cooperating with said at least one dial magnet, whereby said at least one dial magnet, the indicating rotary element and the cylindrical guide magnet are arranged such that, during rotation about the common vertical rotation axis, the rotation angle of said at least one dial magnet corresponds to the rotation angle of both the indicating rotary element and the cylindrical guide magnet.

2. The liquid gas level measuring system according to claim 1, wherein the releasable connection formed by the connection elements of both the dial module lid and the housing is a click-in connection.

3. The liquid gas level measuring system according to claim 2, wherein the at least one connection element of the dial module lid is formed as a socket having engaging means, and the housing in its lower part is formed as the at least one connection element fitting the inner shape of the socket and is provided with engaging means corresponding to the engaging means of the socket.

4. The liquid gas level measuring system according to claim 3, wherein the indicating rotary element is a dial disc, which on its surface facing the cylindrical guide magnet is peripherally provided with the tank volume scale.

5. The liquid gas level measuring system according to claim 4, wherein a single dial magnet is arranged axially below the dial disc.

6. The liquid gas level measuring system according to claim 4, wherein two dial magnets are arranged symmetrically below the dial disc.

7. The liquid gas level measuring system according to claim 3, wherein the indicating rotary element is a gauge pointer, and the tank volume scale is formed as a circular insert fixed inside the dial module body facing said at least one dial magnet.

8. The liquid gas level measuring system according to claim 1, wherein the dial module body and the dial module lid are connected to each other by gluing.

9. The liquid gas level measuring system according to claim 1, wherein the connection between the dial module lid and the housing is sealed.

* * * * *